United States Patent
Lin (10) Patent No.: US 10,207,944 B2
(45) Date of Patent: Feb. 19, 2019

(54) BIOSLUDGE TREATMENT SYSTEM

(71) Applicant: Chang-Ching Lin, Kaohsiung (TW)

(72) Inventor: Chang-Ching Lin, Kaohsiung (TW)

(*) Notice: Subject to any disclaimer, the term of this patent is extended or adjusted under 35 U.S.C. 154(b) by 267 days.

(21) Appl. No.: 15/204,017

(22) Filed: Jul. 7, 2016

(65) Prior Publication Data

US 2017/0008788 A1 Jan. 12, 2017

(30) Foreign Application Priority Data

Jul. 8, 2015 (TW) .............................. 104122179 A (51) Int. Cl.
| | | |
|---|---|---|
| *C02F 1/34* | (2006.01) | |
| *C02F 1/78* | (2006.01) | |
| *C02F 11/06* | (2006.01) | |

(52) U.S. Cl.
CPC ............... *C02F 11/06* (2013.01); *C02F 1/34* (2013.01); *C02F 1/78* (2013.01); *C02F 2303/06* (2013.01); *C02F 2303/18* (2013.01)

(58) Field of Classification Search
CPC ...... C02F 1/34; C02F 1/78; C02F 3/02; C02F 3/1205; C02F 3/121; C02F 3/1221; C02F 3/1242; C02F 3/1247; C02F 3/1278; C02F 3/1284; C02F 3/1289; C02F 3/1294; C02F 3/20; C02F 11/06; C02F 2303/06; C02F 2303/18
See application file for complete search history.

(56) References Cited

U.S. PATENT DOCUMENTS

| | | | | |
|---|---|---|---|---|
| 3,772,187 A | * | 11/1973 | Othmer ..................... | C02F 3/24 210/195.1 |
| 3,799,346 A | * | 3/1974 | Freese .................... | C02F 3/1242 210/124 |
| 4,008,159 A | * | 2/1977 | Besik ..................... | C02F 3/1242 210/151 |

FOREIGN PATENT DOCUMENTS

| | | |
|---|---|---|
| CN | 101456655 A | 6/2009 |
| CN | 101708937 A | 5/2010 |
| CN | 103508617 A | 1/2014 |
| CN | 204265618 U | 4/2015 |
| TW | 201221484 A | 6/2012 |

* cited by examiner

*Primary Examiner* — Lucas A Stelling
(74) *Attorney, Agent, or Firm* — Husch Blackwell LLP (57) ABSTRACT

A biosludge treatment system includes: a fracture unit including a fracture tank formed with a fracture chamber, a first circulation pipeline in fluidic communication with the fracture chamber, and an inner circulation sub-unit disposed in the fracture chamber and in fluidic communication with the first circulation pipeline; a pre-mixing unit mounted downstream of the fracture unit and including a pre-mixing tank formed with a pre-mixing chamber, a fracture chamber-connecting conduit in fluidic communication with the fracture chamber and the pre-mixing chamber; and a lysis unit mounted downstream of the pre-mixing unit and including a lysis tank formed with a lysis chamber, a second circulation pipeline in fluidic communication with the pre-mixing chamber-connecting conduit and the lysis chamber.

13 Claims, 5 Drawing Sheets

BIOSLUDGE TREATMENT SYSTEM

CROSS-REFERENCE TO RELATED APPLICATION

This application claims priority of Taiwanese Application No. 104122179, filed on Jul. 8, 2015.

FIELD

The disclosure relates to a sewage treatment system, and more particularly to a biosludge treatment system.

BACKGROUND

Biosludge is a semi-solid slurry producible from processing in a sewage treatment system in a waste water treatment plant. The biosludge generally includes microorganisms, microorganism metabolites, and organic or inorganic substances present in the sewage.

Figure 1:
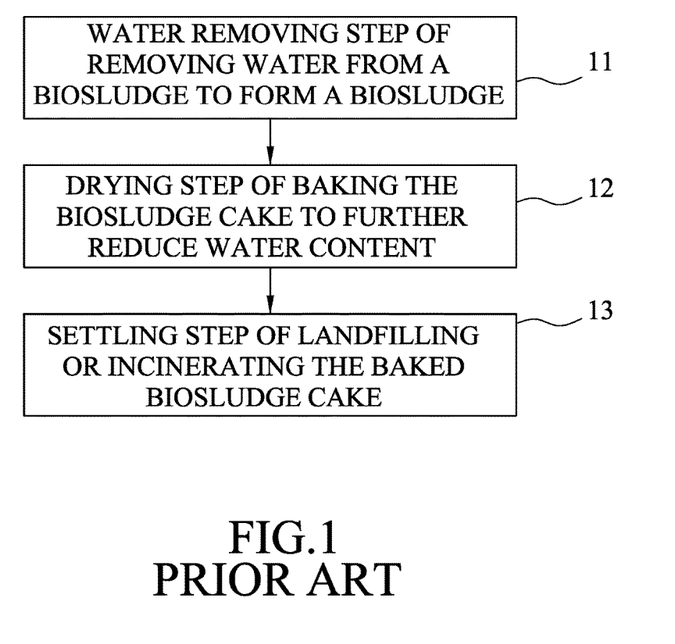
FIG. 1 is a flowchart illustrating a conventional method for disposing a biosludge.

Referring to FIG. 1, a conventional method for disposing a biosludge includes a water removing step 11, a drying step 12, and a settling step 13. In the water removing step 11, a polymer flocculant is added to the biosludge to form flocs, followed by removing water from the biosludge by centrifuging or filtering to form a biosludge cake. In the drying step 12, the biosludge cake is baked to further reduce the water content thereof. Finally, in the settling step 13, the baked biosludge cake is landfilled or incinerated.

Besides, reduction of the biosludge with an ozone treatment is also proposed. However, for decreasing the cost for treatment of the biosludge and for reducing environmental pollution and release of carbon dioxide resulted from incineration, there is room for improving the efficiency in biosludge reduction.

SUMMARY

Therefore, an object of the disclosure is to provide a biosludge treatment system with improvement in efficiency in biosludge reduction.

According to the disclosure, a biosludge treatment system includes a fracture unit, a pre-mixing unit and a lysis unit.

The fracture unit includes a fracture tank formed with a fracture chamber, a first circulation pipeline in fluidic communication with the fracture chamber, and an inner circulation sub-unit disposed in the fracture chamber and in fluidic communication with the first circulation pipeline.

The pre-mixing unit is mounted downstream of the fracture unit and includes a pre-mixing tank formed with a pre-mixing chamber, a fracture chamber-connecting conduit in fluidic communication with the fracture chamber and the pre-mixing chamber 311, a gas supply pipe connected to the fracture chamber-connecting conduit for providing an oxidizing agent gas, a pre-mixing chamber-connecting conduit in fluidic communication with the pre-mixing chamber and mounted downstream thereof.

The lysis unit is mounted downstream of the pre-mixing unit and includes a lysis tank formed with a lysis chamber, a second circulation pipeline in fluidic communication with the pre-mixing chamber-connecting conduit and the lysis chamber, and a flow-directing sub-unit mounted in the lysis chamber.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Before the disclosure is described in greater detail, it should be noted that where considered appropriate, reference numerals or terminal portions of reference numerals have been repeated among the figures to indicate corresponding or analogous elements, which may optionally have similar characteristics.

Figure 2:
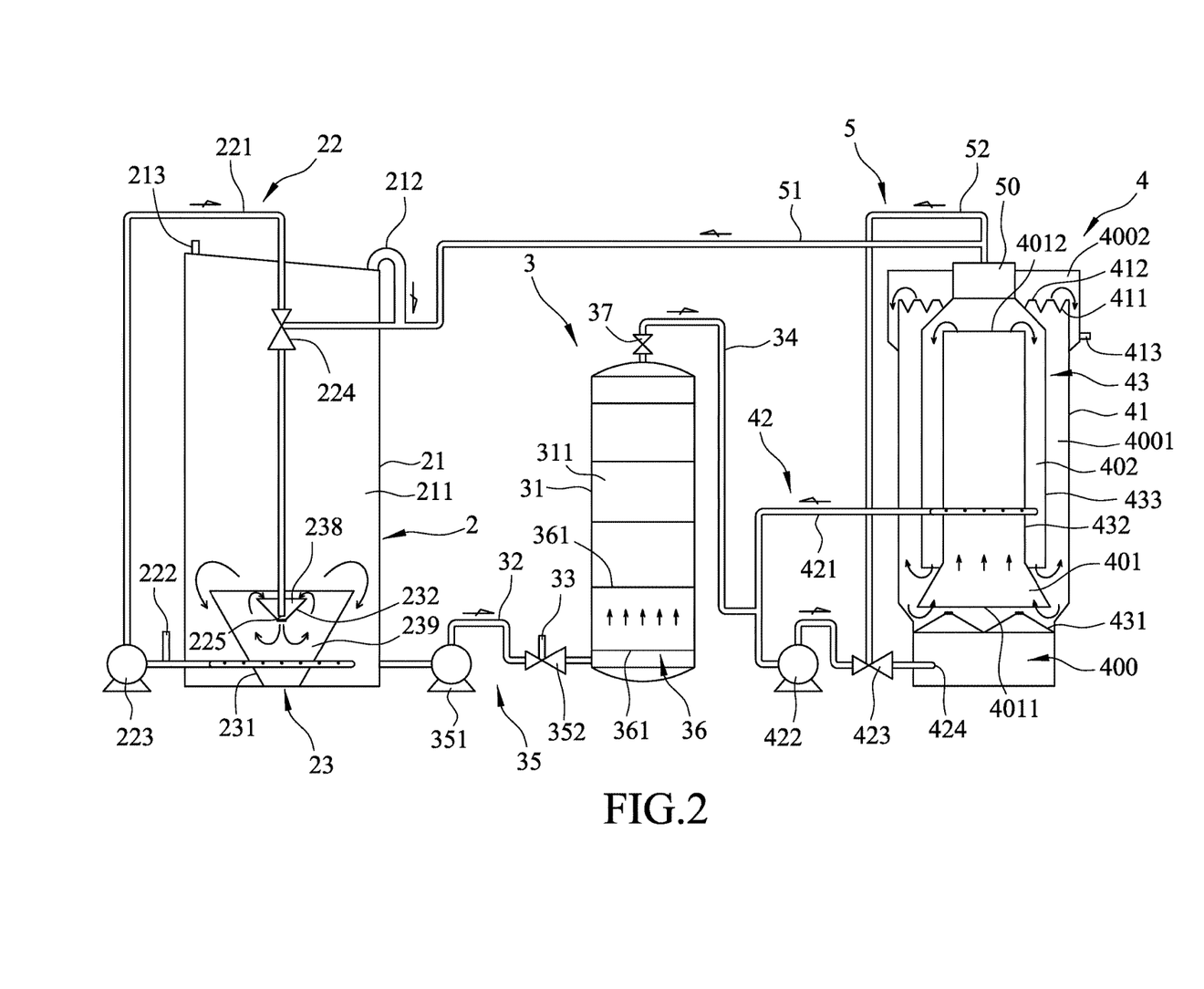
FIG. 2 is a schematic view illustrating an embodiment of a biosludge treatment system according to the disclosure.

Referring to FIG. 2, the embodiment of a biosludge treatment system according to the disclosure is shown to include a fracture unit 2, a pre-mixing unit 3 mounted downstream of the fracture unit 2, a lysis unit 4 mounted downstream of the pre-mixing unit 3, and a gas-recycling unit 5 that is in fluidic communication with the fracture unit 2 and the lysis unit 4.

The fracture unit 2 includes a fracture tank 21 formed with a fracture chamber 211, a first circulation pipeline 22 in fluidic communication with the fracture chamber 211, and an inner circulation sub-unit 23 disposed in the fracture chamber 211 and in fluidic communication with the first circulation pipeline 22. The first circulation pipeline 22 includes a first circulation conduit 221 having two opposite ends in fluidic communication with the fracture chamber 211, an inflow pipe 222 outside the fracture tank 21 and in fluidic communication with the first circulation conduit 221, a first pump 223 that is mounted to the first circulation conduit 221 in a position adjacent to one of the two opposite ends thereof and downstream of the inflow pipe 222, and that is adapted to provide power for circulation operation of the first circulation conduit 221, and a slurry injector 224 mounted to the first circulation conduit 221 in a position adjacent to the other of the opposite ends of the first circulation conduit 221 and within the fracture chamber 211. The first circulation conduit 221 has a slurry outlet 225 positioned downstream of the slurry injector 224 and within the fracture chamber 211.

The inner circulation sub-unit 23 has a baffle member 231 that is mounted within the fracture chamber 211 in a position adjacent to a bottom of the fracture chamber 21, and a first flow-guiding member 232 that is mounted in the baffle member 231. In one form, the baffle member 231 is shaped into an inverted truncated cone and formed with a circulation chamber 239. The first flow-guiding member 232 is received in the circulation chamber 239 and formed with a flow-guiding chamber 238 in fluidic communication with the circulation chamber 239. In one form, the flow-guiding chamber 238 is shaped into an inverted truncated cone and the slurry outlet 225 of the first circulation conduit 221 is positioned in the top of the flow-guiding chamber 238.

Figure 3:
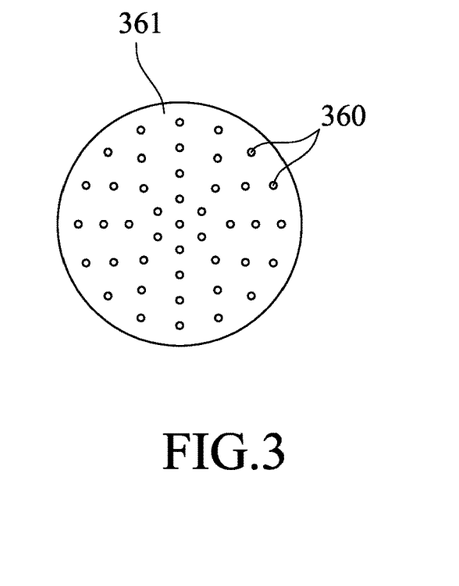
FIG. 3 is a top view illustrating a perforated plate of the embodiment of FIG. 2.

The pre-mixing unit 3 includes a pre-mixing tank 31 formed with a pre-mixing chamber 311, a fracture chamber-connecting conduit 32 in fluidic communication with the fracture chamber 211 and the pre-mixing chamber 311, a gas supply pipe 33 connected to the fracture chamber-connecting conduit 32 for providing an oxidizing agent gas, such as ozone, a pre-mixing chamber-connecting conduit 34 in fluidic communication with the pre-mixing chamber 311 and mounted downstream thereof, a power unit 35 mounted to the fracture chamber-connecting conduit 32, a flow-regulating unit 36 mounted in the pre-mixing chamber 311, and a pressure-releasing valve 37 mounted to the pre-mixing chamber-connecting conduit 34 in a position adjacent to the pre-mixing tank 31. The power unit 35 includes a second pump 351 mounted to the fracture chamber-connecting conduit 32, and a fractured slurry injector 352 mounted downstream of the second pump 351 for injecting a biosludge-containing slurry mixed with the oxidizing agent gas into the pre-mixing chamber 311. Further referring to FIG. 3, the flow-regulating unit 36 includes a plurality of perforated plates 361 mounted in the pre-mixing chamber 311 and spaced apart from each other. Each of the perforated plates 361 includes a plurality of through holes 360.

Referring back to FIG. 2, the lysis unit 4 includes a lysis tank 41 formed with a lysis chamber 400, a second circulation pipeline 42 in fluidic communication with the pre-mixing chamber-connecting conduit 34 and the lysis chamber 400, and a flow-directing sub-unit 43 mounted in the lysis chamber 400. The second circulation pipeline 42 includes a second circulation conduit 421 that has two opposite ends respectively in fluidic connection with the lysis chamber 400 and the flow-directing sub-unit 43, a third pump 422 mounted to the second circulation conduit 421, and a pre-mixture injector 423 mounted to the second circulation conduit 421 and downstream of the third pump 422 for injecting a pre-mixture of the biosludge-containing slurry and the oxidizing agent gas into the lysis chamber 400. The second circulation conduit 421 has an injection port 424 located downstream of the pre-mixture injector 423 and inside the lysis chamber 400.

The flow-directing sub-unit 43 includes a pair of second flow-guiding members 431 mounted in the lysis chamber 400 and above the injection port 424, an inner barrel 432 mounted in the lysis chamber 400 and above the second flow-guiding members 431 and formed with a lysis reaction region 401, and an outer barrel 433 surrounding the inner barrel 432 and cooperating with the inner barrel 432 to define a flow-directing region 402 therebetween. In one form, each of the second flow-guiding members 431 is shaped into a cone shape, and the lysis reaction region 401 has an inlet opening 4011 proximal to the second flow-guiding members 431, and an outlet opening 4012 opposite to the inlet opening 4011 and distal to the second flow-guiding members 431. Moreover, the flow-directing region 402 is in fluidic communication with the lysis reaction region 401 and the remainder of the lysis chamber 400. In one form, the lysis tank 41 of the lysis unit 4 further includes a partition wall 411 mounted in the lysis chamber 400 separated from and outside of the outer barrel 433, at least one outflow weir 412 formed on the partition wall 411, and an outlet pipe 413 in fluidic communication with the lysis chamber 400. The partition wall 411 divides the lysis chamber 400 into a recirculation area 4001 located upstream of the outflow weir 412, and an outflow area 4002 located downstream of the outflow weir 412 and in fluidic communication with the outlet pipe 413.

The gas-recycling unit 5 includes a gas-liquid separator 50 mounted on top of the flow-directing region 402, a first gas-recycling pipe 51 in fluidic communication with the gas-liquid separator 50 and the slurry injector 224, and a second gas-recycling pipe in fluidic communication with the gas-liquid separator 50 and the pre-mixture injector 423. The fracture tank 21 of the fracture unit 2 includes an overflow pipe 212 in fluidic communication with the fracture chamber 211 and the first gas-recycling pipe 51, and an exhaust pipe 213 in fluidic communication with and mounted on top of the fracture chamber 211.

Figure 4:
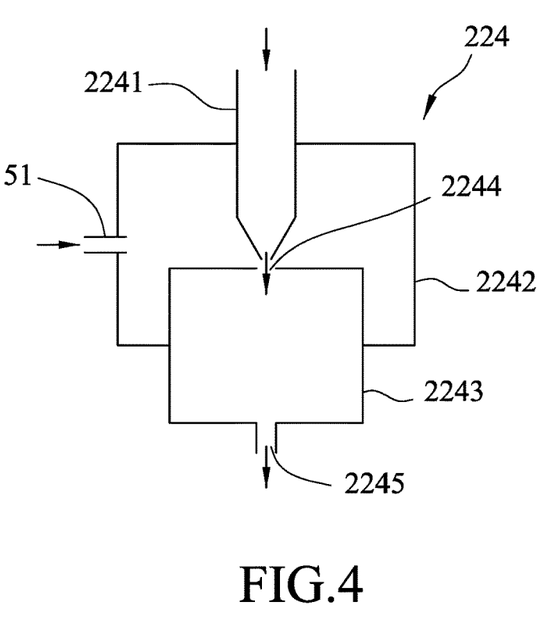
FIG. 4 is a schematic view illustrating a slurry injector of the embodiment of FIG. 2.

Further referring to FIG. 4 in combination with FIG. 2, the gas-recycling unit 5 also provides gas needed for operations of the slurry injector 224 and the pre-mixture injector 423. The slurry injector 224 has a slurry inflow tube 2241 in fluidic communication with the first circulation conduit 221, an inner slurry chamber 2242 in fluidic communication with the slurry inflow tube 2241 and the first gas-recycling pipe 51, and a slurry oscillation chamber 2243 in fluidic communication with the inner slurry chamber 2242. The slurry oscillation chamber 2243 has a slurry inlet 2244 facing the slurry inflow tube 2241, and a slurry outlet 2245 opposite to the slurry inlet 2244. The pre-mixture injector 423 includes a pre-mixture inflow tube that has a structure similar to that of the slurry inflow tube 2241 and is in fluidic communication with the second circulation conduit 421, an inner pre-mixture chamber that has a structure similar to that of the inner slurry chamber 2242 and is in fluidic communication with the pre-mixture inflow tube and the second gas-recycling pipe 52, and a pre-mixture oscillation chamber that has a structure similar to that of the slurry oscillation chamber 2243 and is in fluidic communication with the inner pre-mixture chamber. The pre-mixture oscillation chamber has a pre-mixture inlet that has a structure similar to that of the slurry inlet 2244 and faces the pre-mixture inflow tube, and a pre-mixture outlet that has a structure similar to that of the slurry outlet 2245 and is opposite to the pre-mixture inlet.

Figure 5:
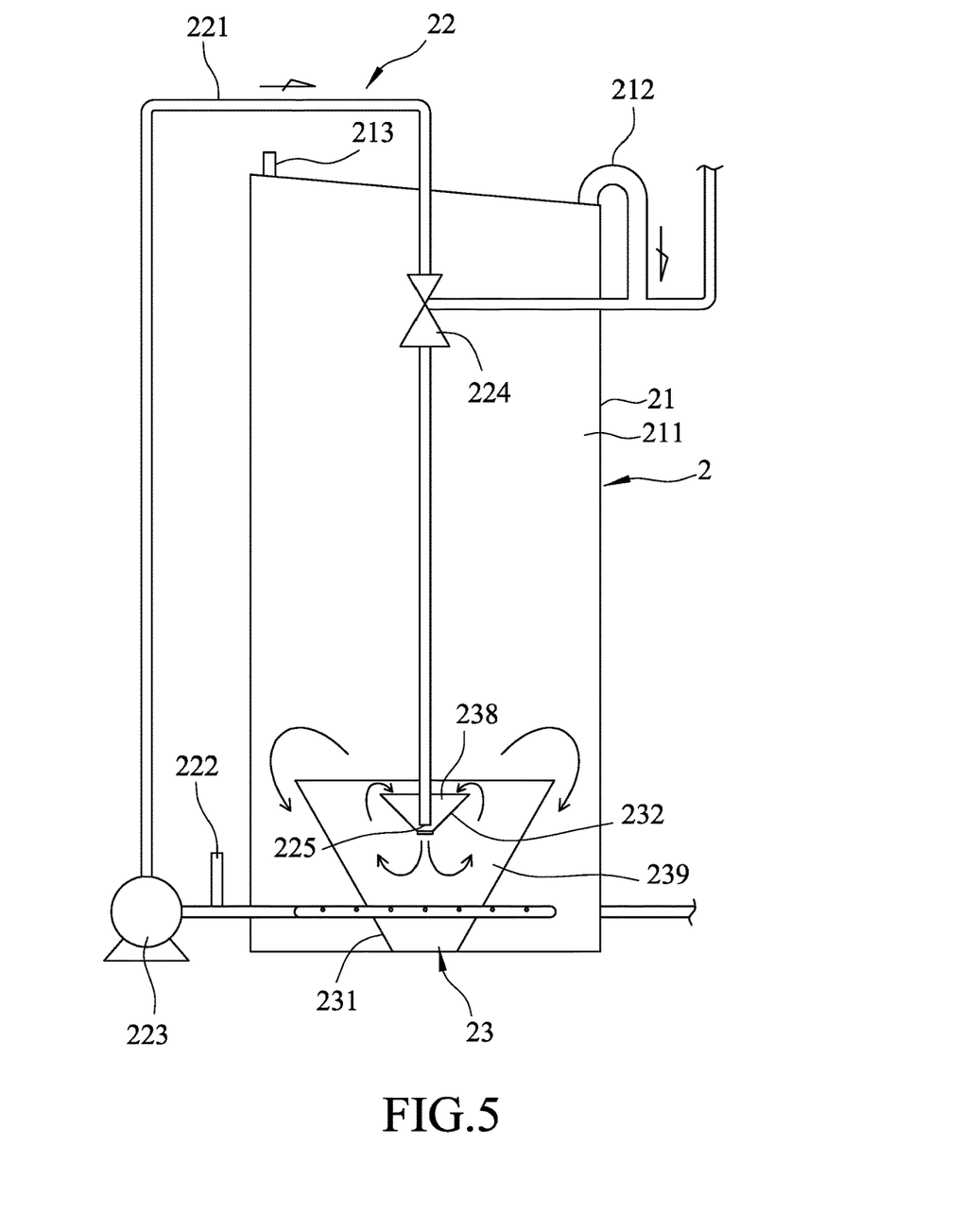
FIG. 5 is a schematic view illustrating a fracture unit of the embodiment of FIG. 2.

Referring to FIG. 5 in combination with FIG. 2, when the biosludge treatment system of this embodiment is applied to treat a biosludge-containing slurry, first, the first pump 223 of the first circulation pipeline 22 is actuated to introduce the biosludge-containing slurry fed from the inflow pipe 222 into the first circulation conduit 221 to be delivered toward the slurry injector 224. Then the biosludge-containing slurry is injected into the fracture chamber 211 of the inner circulation sub-unit 23 through the slurry injector 224. Referring back to FIG. 4, in the slurry injector 224, the biosludge-containing slurry introduced from the first circulation conduit 221 and the recycled oxidizing agent gas introduced from the first gas-recycling pipe 51 are mixed in the slurry inflow tube 2241 and then introduced into the slurry oscillation chamber 2243 through the slurry inlet 2244 to be impulsively oscillated in a vigorous manner. Thereafter, the biosludge-containing slurry and the recycled oxidizing agent gas are impulsively injected at a relatively high speed into the fracture chamber 211 through the slurry out 2245. Subsequently, when the biosludge-containing slurry and the recycled oxidizing agent gas are injected into the first flow-guiding member 232 of the inner circulation sub-unit 23 through the slurry injector 224, by virtue of the design of the baffle member 231 and the first flow-guiding member 232, the biosludge-containing slurry and the recycled oxidizing agent gas may flow in various directions, such as flowing from the flow-guiding chamber 238 to the circulation chamber 239 and then flowing from the circulation chamber 239 back to the flow-guiding chamber 238, or flowing to a portion of the fracture chamber 211 outside the circulation chamber 239. Byway of generation of multidirectional flows of the biosludge-containing slurry and the recycled oxidizing agent gas, hydraulic oscillation is effectively generated to fracture flocs of filamentous zoogleal bacteria present in a biosludge contained in the biosludge-containing slurry, so as to increase surface area of the biosludge for reacting with other reactants, such as the oxidizing agent gas.

In this embodiment, in the fracture chamber 211, the biosludge contained in the biosludge-containing slurry has a concentration adjusted to range from 1 wt. % to 3 wt. %, preferably from 1 wt. % to 1.5 wt. % so as to obtain a relatively good fracture effect.

The biosludge-containing slurry is then driven by the second pump 351 of the power unit 35 to be introduced into the pre-mixing chamber 311 by the fractured slurry injector 352 through the fracture chamber-connecting conduit 32. The oxidizing agent gas, such as ozone, is simultaneously injected into the fractured slurry injector 352 through the gas supply pipe 33 in fluidic communication therewith so that the oxidizing agent gas and the biosludge-containing slurry are introduced into the pre-mixing chamber 311 together. Along with passing of the biosludge-containing slurry and the oxidizing agent gas through the perforated plates 361, the fractured biosludge with increased surface area and the oxidizing agent gas are brought into contact with each other effectively, and a preliminary oxidation reaction takes place to break down cell membranes of the zoogleal bacteria in the fractured biosludge. As a result, a pre-mixture is obtained and delivered downstream to the lysis chamber 400 of the lysis tank 41.

It is noted that the oxidizing agent gas introduced into the pre-mixing chamber 311 has a concentration adjusted based on a dry weight of the biosludge contained in the biosludge-containing slurry. In this embodiment, the oxidizing agent gas is introduced into the pre-mixing chamber 311 in an amount ranging from 0.06 grams to 0.13 grams based on 1 gram of dry weight of the biosludge. The pressure-releasing valve 37 may be operated to maintain a predetermined operating pressure of the pre-mixing unit 3.

Figure 6:
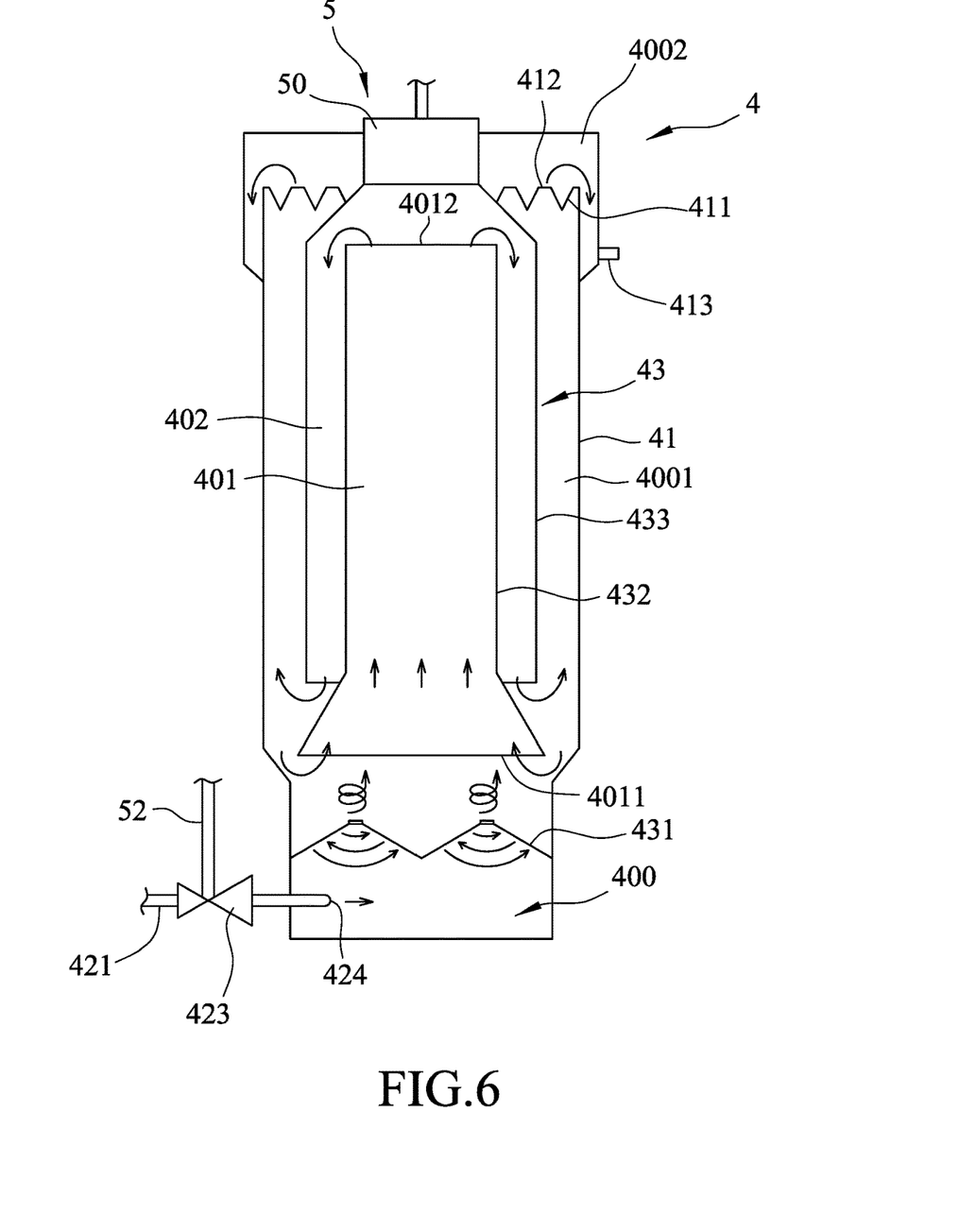
FIG. 6 is a schematic view illustrating a lysis unit of the embodiment of FIG. 2.

Referring back to FIG. 2 in combination with FIG. 6, the pre-mixture obtained from the pre-mixing unit 3 is driven by the third pump 422 of the second circulation pipeline 42 to advance into the lysis chamber 400 through the pre-mixture injector 423. In the pre-mixture injector 423, the biosludge-containing slurry introduced from the pre-mixture inflow tube and the recycled oxidizing agent gas introduced from the second gas-recycling pipe 52 are mixed in the inner pre-mixture chamber and then impulsively oscillated in the pre-mixture oscillation chamber in a vigorous manner, followed by advancing into the lysis chamber 400 as the pre-mixture through the pre-mixture outlet. The pre-mixture introduced into the lysis chamber 400 first passes through the second flow-guiding members 431. By way of the structural design of the truncated cone shape of the second flow-guiding members 232 and the pre-mixture injector, the pre-mixture will be unidirectionally introduced into the lysis chamber 400 and form a helical vortex flowing upward. Through the formation of the helical vortex, the fractured biosludge and the oxidizing agent gas will be brought into further contact with each other. Then, the pre-mixture is introduced into the lysis reaction region 401 through the inlet opening 4011 for further reacting with the oxidizing agent gas to form a reaction mixture. The reaction mixture will fill up the reaction region 401, and flow into the flow-directing region 402 through the outlet opening 4012. The zoogleal bacteria present in the fractured biosludge will be completely lyzed by the oxidizing agent gas and intracellular substances of the zoogleal bacteria will be released to an aqueous phase of the reaction mixture. The solid content of a solid phase the reaction mixture will be reduced so as to achieve the object of biosludge reduction after the aqueous phase is separated from the reaction mixture. The portion of the reaction mixture which flows into the flow-directing region 402 has a relatively large specific gravity, i.e., a portion that is yet to be completely reacted, will stay in the recirculation area 4001 of the lysis chamber 400 and will be brought by the helical vortex to flow back into the reaction region 401. The portion of the reaction mixture which has a relatively small specific gravity, i.e., a portion that has been completely reacted, will flow upward and then flow into the outflow area 4002 through the outflow weir 412, followed by exiting through the outlet pipe 413.

For full utilization of the oxidizing agent gas introduced from the gas supply pipe 33, when the reaction mixture containing the fractured biosludge and the oxidizing agent gas passes through the flow-directing region 402, the oxidizing agent gas will be separated from the reaction mixture and recycled to the first gas-recycling pipe 51 and the second gas-recycling pipe 52 by the gas-liquid separator 50 disposed above the flow-directing region 402. The recycled oxidizing agent gas introduced into the second gas-recycling pipe 52 will be recycled to the lysis chamber 400 through the pre-mixture injector 423 such that the recycled oxidizing agent gas is adapted for continue reacting with the pre-mixture in the lysis chamber 400. On the other hand, the oxidizing agent gas introduced into the first gas-recycling pipe 51 will be recycled to the fracture chamber 211 through the slurry injector 224 so that the biosludge contained in the biosludge-containing slurry is fractured and preliminary reacted with the recycled oxidizing agent gas simultaneously in the fracture chamber 211, thereby enhancing the efficiency of lysis of the zoogleal bacteria in the lysis chamber 400.

Moreover, in cooperation with the gas-recycling unit 5, the fracture tank 21 is further provided with the overflow pipe 212 and the exhaust pipe 213. In this way, the biosludge-containing slurry overflowing from the fracture chamber 211 will flow into the overflow pipe 212 and will be directed to the first gas-recycling pipe 51 and flow to the slurry injector 224 so as to be injected back into the fracture chamber 211 for subsequent treatments. Unreacted oxidized agent gas present in the space above a liquid level of the biosludge-containing slurry received in the fracture chamber 211 will be discharged through the exhaust pipe 213 disposed on the top of the fracture chamber 211.

The biosludge expelled from the biosludge treatment system of the disclosure through the outlet pipe 413 has a significantly reduced weight and most of the microorganisms present therein are destroyed. This treated biosludge may be subjected to other further treatment to be used in different intended applications. For example, the treated biosludge may be filtered under pressure to form a biosludge cake having a water content less than 70% so as to facilitate subsequent reuse, storage and treatment operations. For example, if the sludge cake is rich in calcium-, magnesium- and aluminum-containing minerals, etc., the sludge cake is applicable to be used as construction materials after being sintered. Alternatively, if the sludge cake is riched in nitrogen-, phosphorus- and potassium-containing minerals, etc., the sludge cake is applicable to be used as a fertilizer.

In sum, as disclosed in the foregoing, in the biosludge treatment system of the embodiment, after fracture treatment by the fracture unit 2, the biosludge-containing slurry is introduced into the pre-mixing chamber 311 to proceed with a preliminary reaction with the oxidizing agent gas, such as ozone, and then directed to the lysis chamber 400 by the flow-directing sub-unit 43, the biosludge contained in the slurry can be at least sufficiently or completely reacted with the oxidizing agent gas so as to destroy microorganisms present therein. Furthermore, lysis of the cell membranes of the microorganisms contributes to biosludge reduction in a more efficient manner.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A biosludge treatment system, comprising:
    a fracture unit including a fracture tank formed with a fracture chamber, a first circulation pipeline in fluidic communication with said fracture chamber, and an inner circulation sub-unit disposed in said fracture chamber and in fluidic communication with said first circulation pipeline; a pre-mixing unit mounted downstream of said fracture unit and including a pre-mixing tank formed with a pre-mixing chamber, a fracture chamber-connecting conduit in fluidic communication with said fracture chamber and said pre-mixing chamber, a gas supply pipe connected to said fracture chamber-connecting conduit for providing an oxidizing agent gas, a pre-mixing chamber-connecting conduit in fluidic communication with said pre-mixing chamber and mounted downstream thereof; and
    a lysis unit mounted downstream of said pre-mixing unit and including a lysis tank formed with a lysis chamber, a second circulation pipeline in fluidic communication with said pre-mixing chamber-connecting conduit and said lysis chamber, and a flow-directing sub-unit mounted in said lysis chamber,
    wherein said first circulation pipeline includes a first circulation conduit having two opposite ends in fluidic communication with said fracture chamber, an inflow pipe outside said fracture tank and in fluidic communication with said first circulation conduit, a first pump that is mounted to said first circulation conduit in a position adjacent to one of said two opposite ends thereof and downstream of said inflow pipe and that is adapted to provide power for circulation operation of said first circulation conduit, and a slurry injector mounted to said first circulation conduit in a position adjacent to the other of said opposite ends thereof and within said fracture chamber.

2. The biosludge treatment system of claim 1, wherein said first circulation conduit has a slurry outlet positioned downstream of said slurry injector and within said fracture chamber, said inner circulation sub-unit having a baffle member that is mounted within the fracture chamber in a position adjacent to a bottom of the fracture chamber, and a first flow-guiding member mounted in said baffle member, said baffle member being formed with a circulation chamber, said first flow-guiding member being received in said circulation chamber and formed with a flow-guiding chamber in fluidic communication with said circulation chamber, said slurry outlet of said first circulation conduit being positioned in the top of said flow-guiding chamber.

3. The biosludge treatment system of claim 1, wherein said pre-mixing unit further includes a power unit mounted to said fracture chamber-connecting conduit, said power unit including a second pump mounted to said fracture chamber-connecting conduit, and a fractured slurry injector mounted downstream of said second pump for injecting a biosludge-containing slurry into said pre-mixing chamber.

4. The biosludge treatment system of claim 1, wherein said pre-mixing unit further includes a flow-regulating unit mounted in said pre-mixing chamber.

5. The biosludge treatment system of claim 4, wherein said flow-regulating unit includes a plurality of perforated plates mounted in said pre-mixing chamber and spaced apart among one another, each of said perforated plates including a plurality of through holes.

6. The biosludge treatment system of claim 1, wherein said pre-mixing unit further includes a pressure-releasing valve mounted to said pre-mixing chamber-connecting conduit in a position adjacent to said pre-mixing tank.

7. The biosludge treatment system of claim 1, wherein said second circulation pipeline including a second circulation conduit that has two opposite ends in fluidic communication with said lysis chamber and said flow-directing sub-unit, respectively, a third pump mounted to said second circulation conduit, and a pre-mixture injector mounted the second circulation conduit and downstream of said third pump for injecting a pre-mixture of said biosludge-containing slurry and said oxidizing agent gas into said lysis chamber.

8. The biosludge treatment system of claim 7, wherein said second circulation conduit has an injection port located downstream of said pre-mixture injector and inside said lysis chamber, said flow-directing sub-unit includes:
    a pair of second flow-guiding members mounted in said lysis chamber and above said injection port, an inner barrel mounted in said lysis chamber and above said second flow-guiding members and formed with a lysis reaction region; and
    an outer barrel surrounding said inner barrel and cooperating with said inner barrel to define a flow-directing region therebetween.

9. The biosludge treatment system of claim 8, wherein said lysis tank of said lysis unit further includes a partition wall mounted in said lysis chamber to be separated from and outside said outer barrel, at least one outflow weir formed on said partition wall, and an outlet pipe in fluidic communication with said lysis chamber, said partition wall dividing said lysis chamber into a recirculation area located upstream of said outflow weir and an outflow area located downstream of said outflow weir and in fluidic communication with said outlet pipe.

10. The biosludge treatment system of claim 8, further comprising a gas-recycling unit that is in fluidic communication with said fracture unit and said lysis unit, said gas-recycling unit including a gas-liquid separator mounted on top of said flow-directing region, a first gas-recycling pipe in fluidic communication with said gas-liquid separator and said slurry injector, and a second gas-recycling pipe in fluidic communication with said gas-liquid separator and said pre-mixture injector.

11. The biosludge treatment system of claim 10, wherein said fracture tank of said fracture unit including an overflow pipe in fluidic communication with said fracture chamber and said first gas-recycling pipe, and an exhaust pipe in fluidic communication with and mounted on top of said fracture chamber.

12. The biosludge treatment system of claim 10, wherein said slurry injector has a slurry inflow tube in fluidic communication with said first circulation conduit, an inner slurry chamber in fluidic communication with said slurry inflow tube and said first gas-recycling pipe, and a slurry oscillation chamber in fluidic communication with said inner slurry chamber, said slurry oscillation chamber having a slurry inlet facing said slurry inflow tube and a slurry outlet opposite to said slurry inlet.

13. The biosludge treatment system of claim 10, wherein said pre-mixture injector has a pre-mixture inflow tube in fluidic communication with said second circulation conduit, an inner pre-mixture chamber in fluidic communication with said pre-mixture inflow tube and said second gas-recycling pipe, and a pre-mixture oscillation chamber in fluidic communication with said inner pre-mixture chamber, said pre-mixture oscillation chamber having a pre-mixture inlet facing said pre-mixture inflow tube and a pre-mixture outlet opposite to said pre-mixture inlet.

* * * * *